United States Patent [19]
Yoshimura

[11] Patent Number: 5,499,225
[45] Date of Patent: Mar. 12, 1996

[54] OPTICAL RECORDING METHOD

[75] Inventor: Ryuichiro Yoshimura, Saitama, Japan

[73] Assignee: Pioneer Electronic Corporation, Tokyo, Japan

[21] Appl. No.: 281,536

[22] Filed: Jul. 28, 1994

Related U.S. Application Data

[63] Continuation of Ser. No. 11,829, Feb. 1, 1993, abandoned, which is a continuation of Ser. No. 782,204, Oct. 24, 1991, abandoned.

[30] Foreign Application Priority Data

Oct. 25, 1990 [JP] Japan .................................. 2-287992

[51] Int. Cl.$^6$ ...................................................... G11B 7/00
[52] U.S. Cl. .................................. 369/58; 369/50; 369/54
[58] Field of Search ................................ 369/32, 47, 59, 369/48, 58, 50, 54

[56] References Cited

U.S. PATENT DOCUMENTS

| | | | |
|---|---|---|---|
| 4,791,623 | 12/1988 | Deiotte | 369/59 |
| 4,942,565 | 7/1990 | Lagadec | 369/59 |
| 4,996,678 | 2/1991 | Maeda | 369/32 |
| 5,043,967 | 8/1991 | Gregg et al. | 369/32 |
| 5,065,388 | 11/1991 | Roth et al. | 369/47 |
| 5,177,720 | 1/1993 | Kondo | 369/32 |
| 5,197,053 | 3/1993 | Baas | 369/32 |

Primary Examiner—Georgia Y. Epps
Assistant Examiner—P. W. Huber
Attorney, Agent, or Firm—Nikaido, Marmelstein, Murray & Oram

[57] ABSTRACT

A CD write-once disk has a program area in which programs are written, and a PMA in which a table of contents of the information written in the program area is written, and a pregroove for representing an absolute time on the disk. An unrecorded disk mounted on a turn table is determined when a table of contents is not written in the PMA. In that case, an optical pickup is moved to a predetermined position in the program area based on the absolute time obtained from the pregroove.

1 Claim, 4 Drawing Sheets

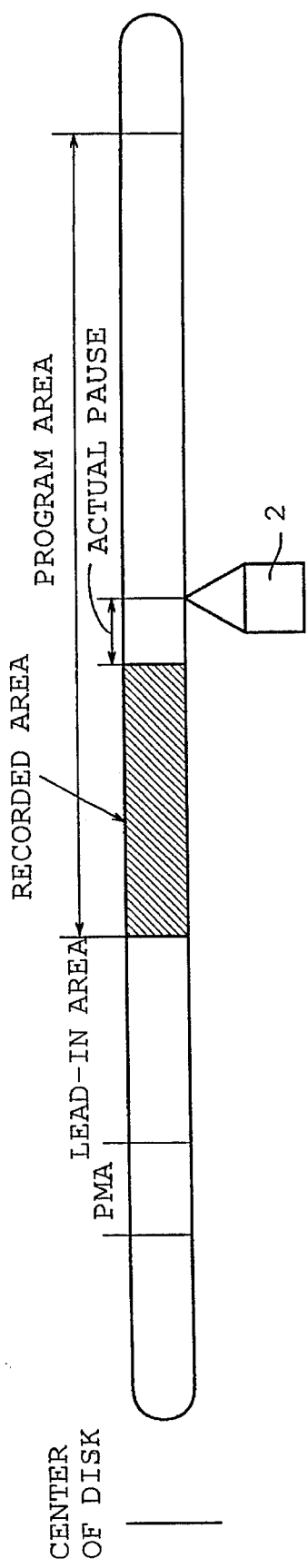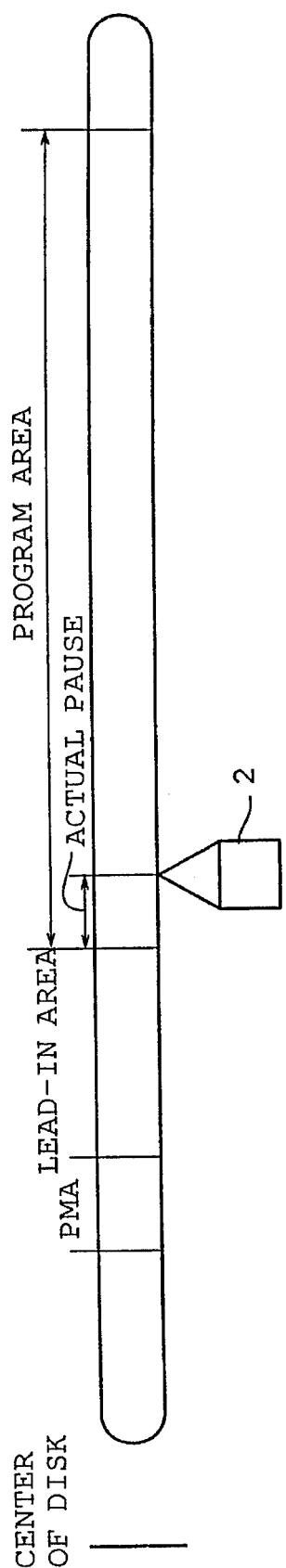

OPTICAL RECORDING METHOD

This application is a continuation of application Ser. No. 08/011,829 filed Feb. 1, 1993, now abandoned, which is a continuation of application Ser. No. 07/782,204 filed Oct. 24, 1991, now abandoned.

BACKGROUND OF THE INVENTION

The present invention relates to a system for recording programs and data on an optical disk.

An optical disk on which programs and data can be recorded once by laser beams has been developed in recent years, which is generally called CD Write-Once disk, or called CD-WO disk.

It would be convenient if the CD-WO disk can be played on a conventional CD player. In order to enable the CD player to play back a CD-WO disk, programs and data must be recorded on the CD-WO disk in accordance with the format of the CD recording. The CD has a lead-in area, a program area, and a lead-out area.

In the program area, programs are recorded together with sub-code data such as start time of a music program, elapsed time of each music program. In the read-in area, a TOC (table of contents) which is comprised of contents of information written in the program area is recorded.

On the other hand, the CD-WO disk has a lead-in area, a program area, and a lead-out area, similarly to the CD. Furthermore, a PCA (power calibration area) and a PMA (program memory area) are provided before the read-in area. By recording the areas of the CD-WO disk in accordance with the format of the CD, the CD-WO disk can be played back on the CD player.

However, an actual pause of at least two seconds must be provided at the start of the program area (before the start of music) of the CD. Namely, a blank of two seconds is formed before the start of the program. Therefore, if a program is recorded on the CD-WO disk in accordance with the format of the CD, it is probable that a part of the program for two seconds at the beginning thereof is cut off. In order to solve such a problem, it is necessary to generate the program to be recorded after the actual pause is formed. However, it is difficult to control the generation of the program.

SUMMARY OF THE INVENTION

An object of the present invention is to provide a system which may record a program and data on the CD-WO disk in accordance with the format of the CD without cutting off a beginning portion of the program.

In the PMA, sub-code data on recorded items such as the start time of the recorded program music and the end time of the recording are written. Furthermore, a wobbled pregroove is spirally formed in the CD-WO disk along a track of the disk. The wobbling waves obtained by the pregroove are modulated in frequency for producing an ATIP (Absolute Time IN Pregroove). Therefore, it is possible to know whether the CD-WO disk to be recorded in accordance with the CD format is a recorded disk or an unrecorded disk, and to know an end of a recorded program on the CD-WO, from the information in the PMA and the ATIP.

The present invention uses such information recorded on the CD-WO disk.

According to the present invention, there is provided a system for recording programs and data on an optical disk comprising the optical disk having a first area in which programs are written, a second area in which a table of contents of the programs written into the first area is written.

Determining means is provided for determining whether a program is written in the first area and for producing an unrecorded disk signal when no program is written in the first area, and recording control means is provided to respond to the unrecorded disk signal for moving an optical pickup to a predetermined position in the first area based on the absolute time obtained from the time informing means.

In one aspect of the invention, the determining means produces an unrecorded disk signal when a table of contents is not written in the second area.

In another aspect, the optical disk is a CD-write-once disk, and the time informing means is a pregroove formed in the disk, and the second area is a program memory area (PMA).

The other objects and features of this invention will become understood from the following description with reference to the accompanying drawings.

BRIEF DESCRIPTION OF DRAWINGS

FIG. 2 is a schematic illustration showing a recorded CD-WO disk;

FIG. 3 is a schematic illustration showing an unrecorded CD-WO disk; and

DETAILED DESCRIPTION OF THE PREFERRED EMBODIMENT

Figure 1:
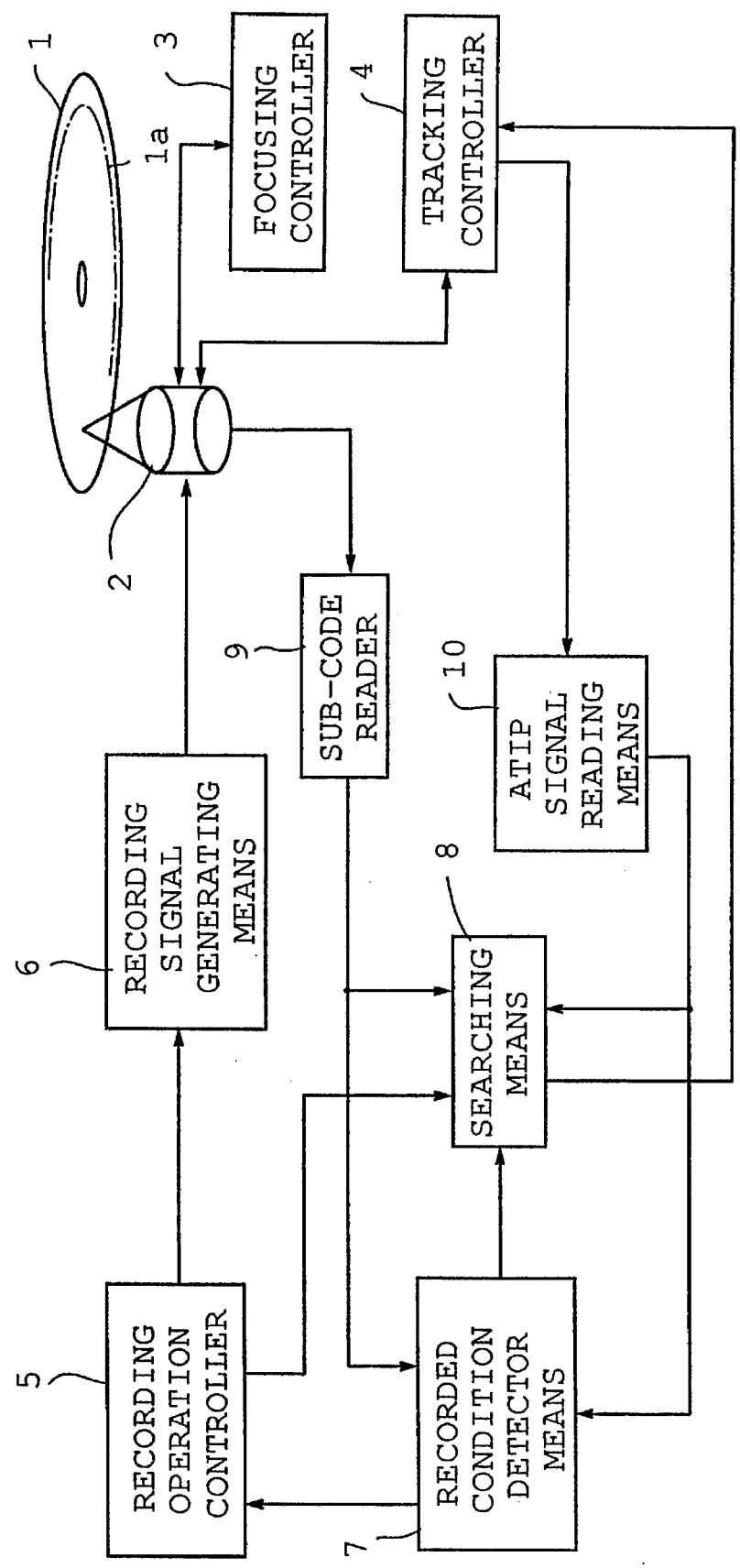
FIG. 1 is a block diagram showing a system of the present invention.

Referring to FIG. 1 showing the system of the present invention, a CD-WO disk 1 is mounted on a turn table of a recording device (not shown). A pregroove 1a having a wobbled inside wall is spirally formed in the CD-WO disk along a track thereon. The CD-WO disk 1 is rotated by a spindle motor through the turn table. An optical pickup 2 is provided for recording programs and data on the disk and for reading information written on the disk with laser beams radiated therefrom. The pickup 2 is controlled in the vertical direction on the disk by a focusing controller 3 for focusing the laser beam on the surface of the disk, and controlled in the radial direction of the disk by a tracking controller 4 so that the beam traces the track and the pregroove 1a on the disk.

The pickup 2 reads information on the disk 1 and produces a signal dependent on the read out data. The signal is applied to a sub-code reader 9. If the disk 1 is a recorded disk, the sub-code data written in the PMA of the recorded disk, which includes the end time of the recorded program as described above, are extracted by the sub-code reader 9. Thus, the end of the recorded program can be detected by the sub-code reader 9.

On the other hand, in order to detect the absolute time on the disk 1, ATIP signal reading means 10 is provided for receiving a tracking error signal from the tracking controller 4. The tracking error includes the wobbling frequency dependent on the pregroove. Since the wobbling wave is frequency-modulated, the ATIP can be detected from the tracking error signal.

Recorded condition detector means 7 is supplied with output signals of the sub-code reader 9 and the ATIP signal reading means 10 for detecting whether the disk 1 is a recorded disk or an unrecorded disk, and for detecting the end of the recorded program when the disk is the recorded disk.

In order to control the operation of the whole of the system, a recording operation controller 5 is provided. Recording signal generating means 6 is provided for performing the encoding of information, optical modulation and so forth to produce a recording signal which is applied to the optical pickup 2. Searching means 8 is provided for moving the pickup 2 in the radial direction in accordance with output signals of the controller 5 and the recorded condition detector means 7 based on the sub-code data and the ATIP data.

In operation, when the CD-WO disk 1 is mounted on the turn table, the searching means 8 operates to search the PMA on the disk in accordance with a search command signal from the recording condition detector means 7. If the CD-WO disk is the recorded disk, sub-code data are written in the PMA, which is detected by the detector means 7.

From the sub-code data, the position of the end of the recoded program is detected. The detector means 7 produces a search signal, so that the searching means 8 operates to locate the pickup at the end position of the recorded program with an actual pause.

FIG. 2 shows the relative position between the recorded CD-WO disk and the pickup 2.

On the other hand, when the CD-WO disk is an unrecorded one, the detector means 7 produces a search signal. In accordance with the search signal, the searching means operates to search a position after the lead-in area with an actual pause, for example with a pause of 2 seconds. The position is detected from the ATIP, while moving the pickup 2 by the tracking controller 4. Thus, the pickup is located at the desired position. Thereafter, a program signal to be recorded is fed to the pickup 2 to record it on the CD-WO disk.

FIG. 3 shows the position of the pickup 2 on the unrecorded disk. From the figure, it will be seen that the actual pause is provided at the beginning of the program area.

The operation of the system will be described hereinafter with reference to FIG. 4.

When the mounting of the CD-WO disk is detected at a step S1, the recorded condition is detected at a step S2. When demanding the recording is detected at a step S3, it is determined at a step S4 whether the disk is unrecorded disk. When the disk is a recorded disk, the end position of the recorded area is searched from the sub-code data in the PMA at a step S5, and the pickup is located at a position with an actual pause after the determined position of recorded area. When the disk is an unrecorded one, the pickup is located at a position with an actual pause of 2 seconds after the lead-in area at a step S6. Thereafter, recording operation is started at a step S7.

Figure 5:
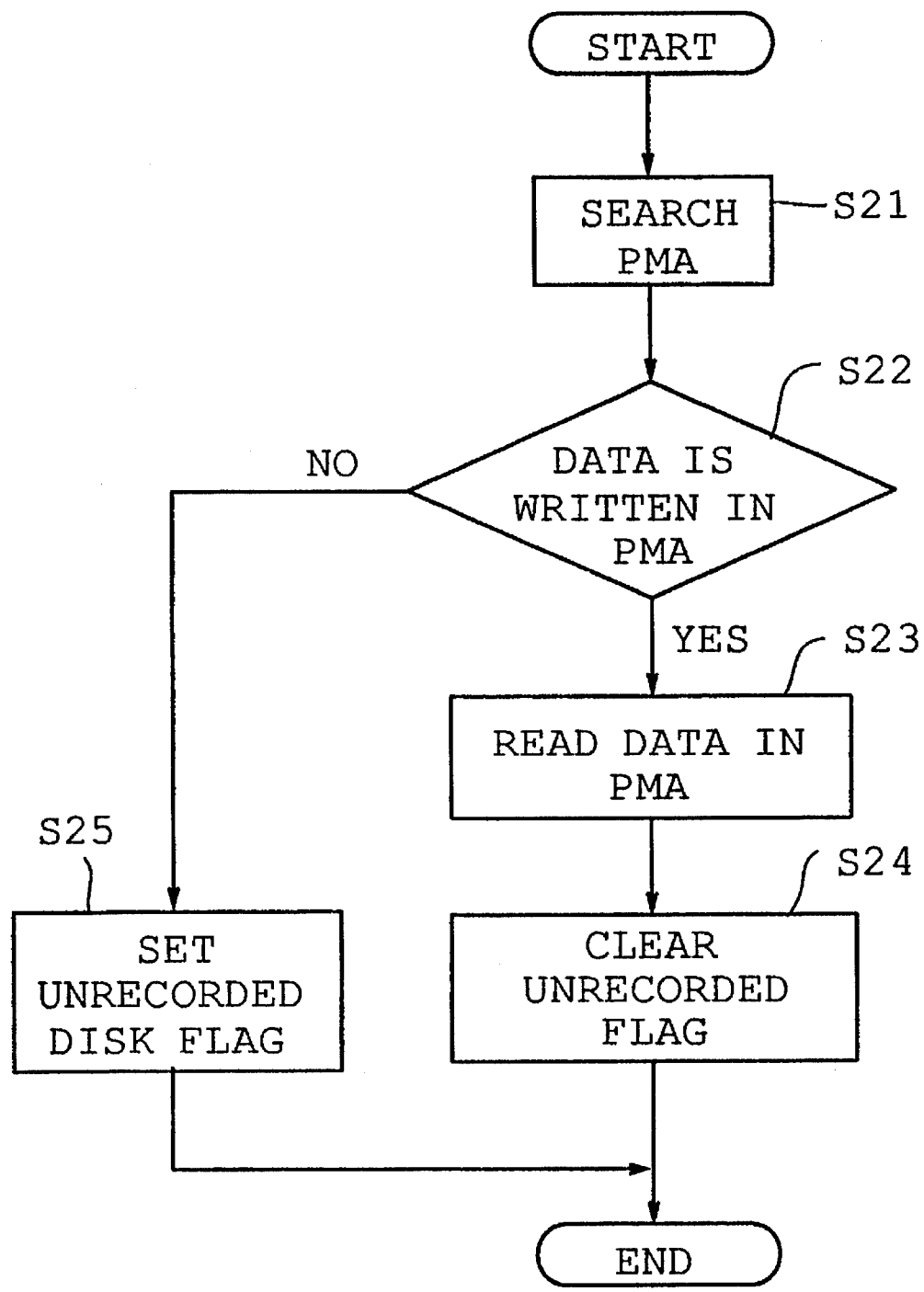

FIG. 5 shows the detecting operation at the step S2 in detail.

At a step S21, the PMA is searched, and it is determined whether data is written in the PMA at a step S22. If data is written in the PMA, the program proceeds to a step S23. The fact that the data is written in the PMA means that the disk is a recorded disk. Accordingly, data recorded in the PMA is read out, and an unrecorded disk flag is cleared at a step S24. When it is determined that the disk is an unrecorded disk at the step 22, an unrecorded disk flag is set at a step S25.

Figure 4:
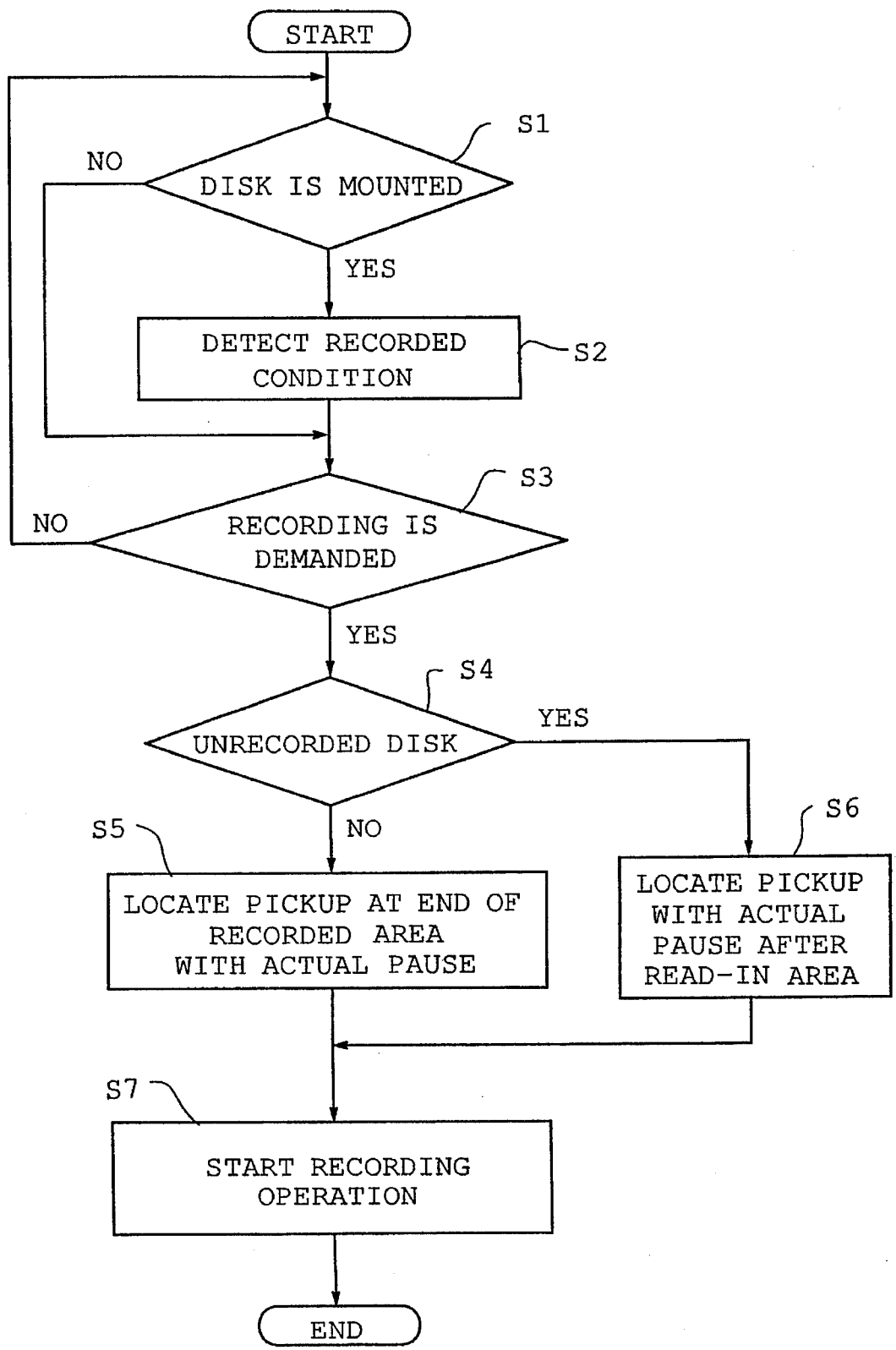
FIGS. 4 and 5 are flowcharts showing the operations of the system.

Thus, it is easily determined whether the disk is recorded or not by determining whether the unrecorded disk flag is set or not at the step S4 of FIG. 4.

When the program is thus recorded in the program area of the CD-WO disk, recorded data such as a start time and an end time of the recorded data are written in the PMA, and TOC are written in the lead-in area based on the data in the PMA. Thereafter, blank data are written in the actual pause area. Ater that the recording of data can be easily performed on the CD-WO disk in accordance with the recorded TOC as is performed in the ordinary CD.

In accordance with the present invention, a program can be recorded on the CD-WO disk without cutting off a beginning portion of the program.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A method for recording a first program and data on an optical disc at a first recording start position by means of an optical pickup so that said program can be properly reproduced by a compact disk (CD) player, the optical disk having a first area in which the program is recorded and a second area in which data are written, the disc being either one of an unrecorded and a recorded disk, said method comprising the steps of:

determining, by reading said second area of the disk to determine whether the first area has a program or no program recorded therein, and if it is determined that no program is recorded, providing an unrecorded disk signal;

detecting whether an unrecorded disk signal is produced, and upon detecting such signal, moving said optical pickup to a first record start position with an actual pause after a beginning of a start position of the first area;

starting to record a program from said first record start position, without recording information at a position of the actual pause; and recording blank data in the position of the actual pause after finishing of recording the program in the first area.

* * * * *